Dec. 4, 1928. W. H. WOOD Re. 17,155

MANUFACTURE OF HEADLIGHTS

Original Filed Aug. 17, 1923 2 Sheets-Sheet 1

WILLIAM H. WOOD
INVENTOR
BY Smith & Freeman
ATTORNEYS

Dec. 4, 1928.
W. H. WOOD
MANUFACTURE OF HEADLIGHTS
Re. 17,155
2 Sheets-Sheet 2
Original Filed Aug. 17, 1923
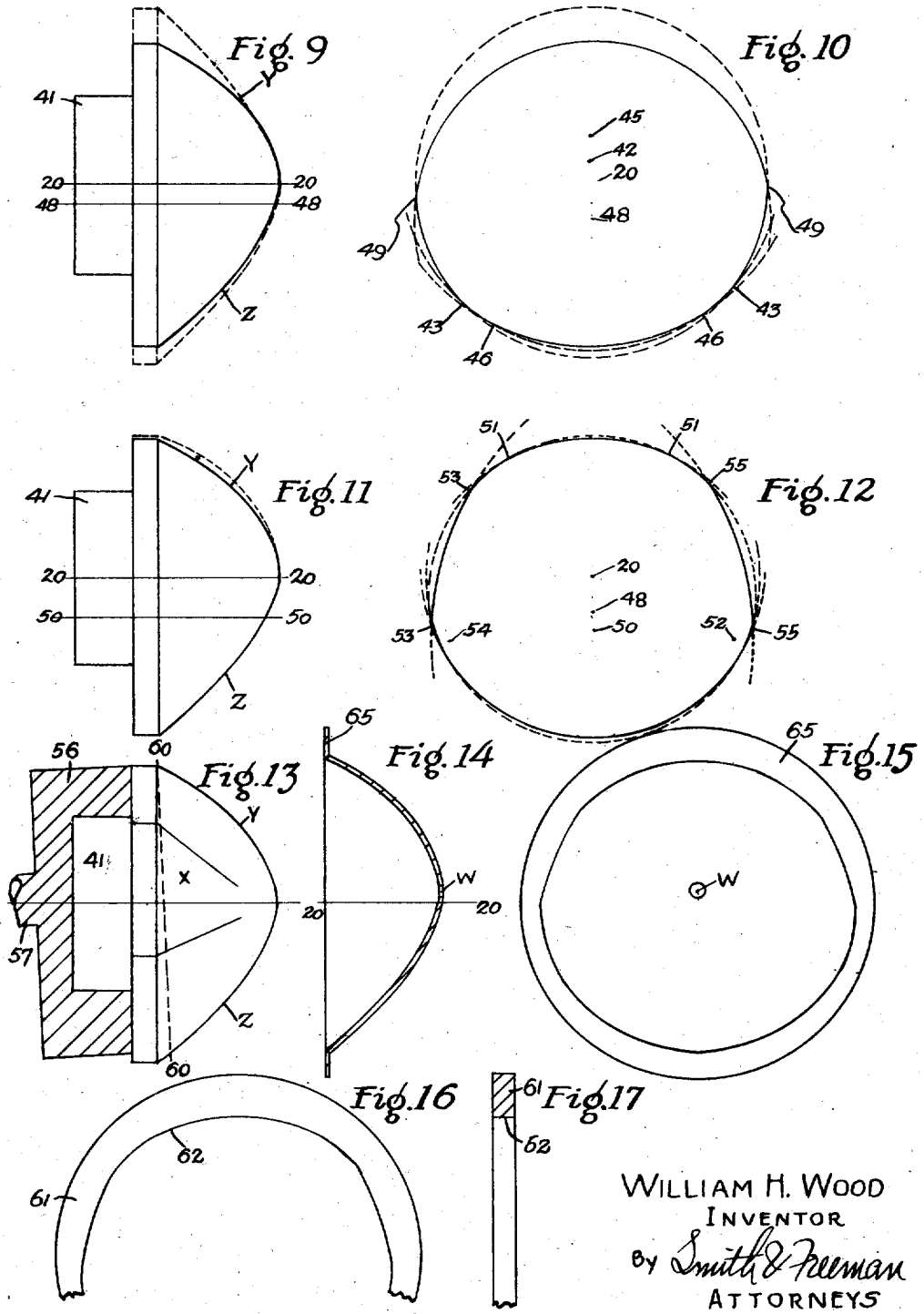
WILLIAM H. WOOD
INVENTOR
By Smith & Freeman
ATTORNEYS Reissued Dec. 4, 1928. Re. 17,155

UNITED STATES PATENT OFFICE.

WILLIAM H. WOOD, OF SOUTH EUCLID, OHIO.

MANUFACTURE OF HEADLIGHTS.

Original No. 1,668,706, dated May 8, 1928, Serial No. 657,996, filed August 17, 1923. Application for reissue filed June 11, 1928. Serial No. 284,629.

This invention relates to vehicle headlights and has for its object the provision of a new and improved punch and die whereby a one-piece sheet metal reflector can be simply and easily made which shall produce a legally acceptable and practically satisfactory distribution of light without the use of lenses, prisms, shades, dimmers or other expensive, fragile, or light killing devices. Other objects of the invention relate to the production of such a punch and die each from a single piece of metal; the provision of a punch of such construction that it can readily be dressed or re-shaped; the provision of a device of this character which can be very quickly and cheaplv produced; the provision of an improved headlight reflector, while further objects and advantages of the invention will become apparent as the description proceeds.

Figure 1:
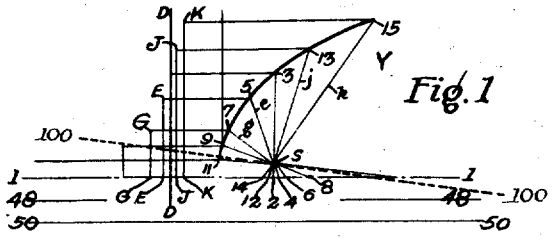
Figure 2:
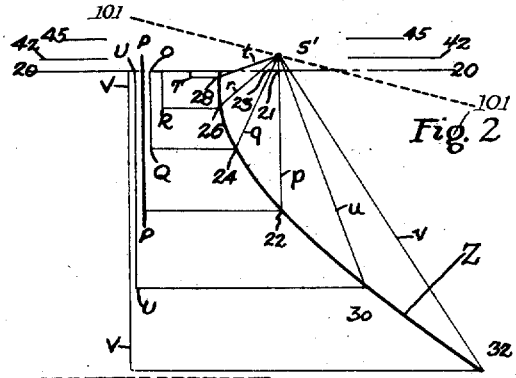
Figure 3:
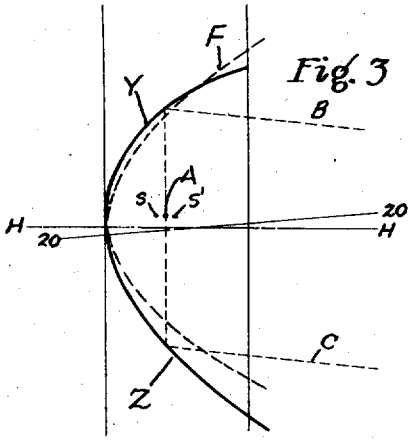
Figure 4:
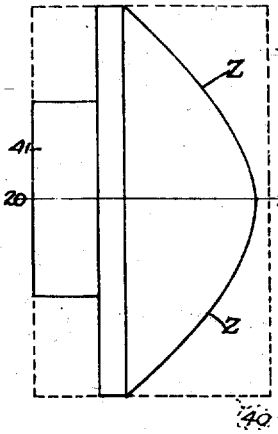
Figure 5:
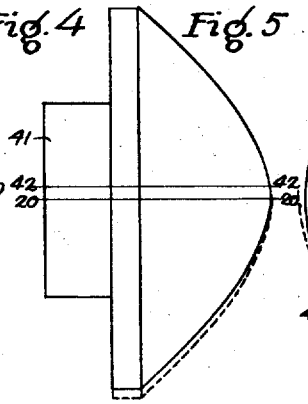
Figure 6:
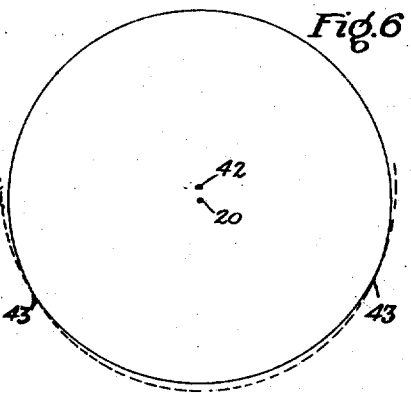
Figure 7:
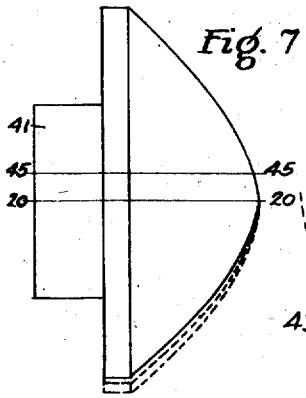
Figure 8:
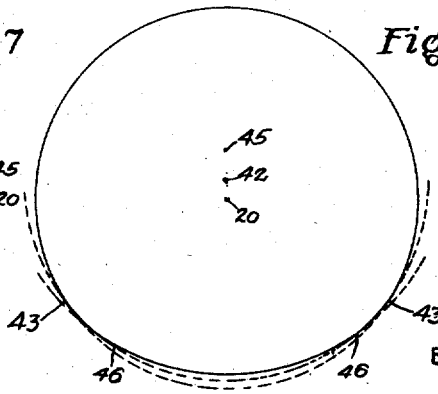

In my former application filed Jan. 24, 1923, Serial No. 614,694 I described a certain mathematical surface for use in the construction of headlight reflectors for producing a light which is not only legally satisfactory, but also to a considerable extent independent of minor variations in focal distance. The present invention contemplates the use of these curves, or other curves similarly found, but refers specifically to the manner of impressing these curves upon the metal block whereby the tool itself is produced. In the drawings accompanying and forming a part of this application wherein I have shown in detail one mode of producing my improved tool; Fig. 1 is a diagrammatic view showing the mode of generating my improved curve as employed for the top portion of my reflector; Fig. 2 shows the mode of generating my improved curve as employed for the lower part of my reflector: Fig. 3 is a diagrammatic view showing the preferred mode of assembling these curves together and disposing them with reference to the horizontal, this diagram conforming substantially to the central vertical section of my preferred reflector; Fig. 4 illustrates the first step in the preparation of my improved reflector punch; Fig. 5 represents the second step; Fig. 6 is a face view of the punch shown in Fig. 5; Fig. 7 illustrates the same punch at the conclusion of the next step; Fig. 8 is a face view of the punch in Fig. 7; Fig. 9 illustrates the same punch after having had the first cut taken off its upper part; Fig. 10 is a face view of the punch shown in Fig. 9; Fig. 11 shows the same punch after having had the next cut taken off its upper portion; Fig. 12 is a front view of the punch shown in Fig. 11; also illustrating the nature of the next succeeding step; Fig. 13 is a side elevation of the completed punch; Fig. 14 is a vertical central section of a reflector made thereon; Fig. 15 is a front elevation of the reflector shown in Fig. 14; Fig. 16 is a face view of the die or ring member with which the punch co-operates; and Fig. 17 is a sectional view of the ring shown in Fig. 16.

My improved curve consists in effect of a plurality of parabolas merging one into the other, each portion corresponding to a different focal point. The shape of the curve for the top half of the reflector is materially different from that of the lower part and is developed as follows: I draw the line 1—1 of Fig. 1 to represent the horizontal axis and above it I locate the point S say one-fourth inch therefrom, this distance corresponding to the intended elevation of the light source above the reflector axis. It will be understood that this displacement may be either less or greater than the amount I have suggested, and will also depend upon the focal depth of the curve. If made too great, difficulty will be experienced in merging together the different surfaces inasmuch as they will be severly warped; if made too small, the desired light control will not be obtained. The present drawings are exaggerated in all respects in order to show the theory of operation within the small scale permitted.

Through the point S I draw a vertical line two inches long ending at the axis at 2. This line corresponds to the parameter of a parabola and its upper end 3 is a point of the curve at which its inclination to the axis 1—1 is substantially 45°. Also at a point in the rear of the line 2—3 I draw a parallel line D—D at the same distance from the point 3 as 3 is distant from 2. This line corresponds to the directrix of a parabola, and the procedure thus far conforms exactly to that which would be followed if a parabola were to be drawn about the point 2, with a focal distance of one inch. Of course I do not limit myself to this size.

However, if the point S be considered as a light source, then its virtual position along the axis 1 will depend upon the angularity with which the rays strike that axis. For example I now draw an inclined line through the point S so as to intersect both the axis 1—1 and the probable curve, say the line *e* intersecting the axis at 4. I then draw a perpendicular E—E the same distance behind the line D—D that 4 lies in front of 2 and on the line *e* I locate the point 5 which is equidistant from the line E—E and the intersection 4. In other words the point 5 constitutes a point on a parabola whose true focus is 4 and directrix is E—E.

I then draw another inclined line *g* through the point S intersecting the axis at 6, and also draw a corresponding directrix G—G as far behind D—D as the point 6 lies in front of the point 2. On this line I then find the point 7 which is equidistant from the point 6 and from the line G—G, the point 7 being upon a parabola whose focus is 6 and whose directrix is G—G. I repeat the same performance for a sufficient number of other lines to locate other points 8, 9, etc. and thus plat an accurate curve between the parameter and the vertex.

I then draw an inclined line *j* through the point S intersecting the axis at 12 between the parameter and the vertex and to accompany it I draw a perpendicular J—J as far in front of the line D—D as 12 is behind 2, after which I find the point 13 on this line which is equidistant from the point 12 and the line J—J, this point being located on a parabola whose focus is 12 and whose directrix is J—J. This is repeated for the lines *k* and K—K etc. and giving points 14, 15 and as many other times as desired after which a curve Y is drawn connecting the points 3, 5, 7, 9, 11, 13, 15.

To plat the line below the axis I draw a second straight line 20—20 as in Fig. 2 and place at one-fourth inch above it (or whatever distance I previously employed) a point S′ from which I drop a perpendicular *p* intersecting the axis at 21; and on this line at about two and one-fourth inches (more or less, but preferably a little more than the distance 2—3 for a reason to be explained hereafter) below the line I locate the point 22 which is a point on the curve. Also I drop the perpendicular P—P so located that the point 22 shall be equidistant from 21 and from P—P.

I then draw an inclined line *q* through the point S′ intersecting the axis 20 at 23 behind the point 21 and I also draw a second perpendicular Q—Q the same distance in front of P—P as 23 is behind 21. On the line *q* I then locate the point 24 equidistant from the point 23 and from the line Q—Q. After repeating this with other lines *r*, *t*, etc. I find the points 26, 28, etc. sufficient in number to define an accurate curve. I draw other lines as *u*, and *v* intersecting the axis in front of the point 21 and for each I draw a corresponding perpendicular as U—U, V—V an equal distance behind the line P—P thus finding the points 30, 32, etc. in the same fashion. I then connect the points 22, 24, 26, 28, 30, 32 producing the curve Z.

This particular curve is mathematically known as a "cubic" and when accurately made is defined by the equation:

$$y^3 - cy^2 - 4pxy + 4cx^2 = 0$$

wherein *p* is the abscissa and *c* the ordinate of the point S or S′, but it can be demonstrated that throughout a considerable arc the same is practically indistinguishable from the portion of a parabola lying between its vertex and parameter, the axis of said parabola passing through the point S or S′ and inclined forwardly and downwardly so as to make an oblique angle with the construction axes 1—1 and 20—20 respectively. Such parabolic axis is indicated at 100 in Fig. 1 and 101 in Fig. 2.

According to my preferred species the reflector to be made from these curves has a central vertical section made by assembling these curves as shown in Fig. 3, the line 1—1 being superposed upon the line 20—20 with the point S located slightly behind the point S′. If the distance 21, 22 was properly chosen relative to the distance 2—3, the vertices of the two curves will match properly with the desired longitudinal separation of these points which is preferably rather small say $\frac{1}{16}$ inch (it will be understood that the present patent drawings are entirely out of proportion in order to produce sufficient separation of the different points and lines for ready reference). If a light source A be located at any point between S and S′, all rays falling on Y will be reflected forwardly and downwardly as shown at C. Indeed this downward deflection is so great as to render it desirable to tip the reflector upwardly as regards the horizontal line H—H. The dotted line F in Fig. 3 indicates a true parabola drawn about the axis 20 for purposes of comparison.

I will now describe the mode whereby I apply my improved curves to the metal tool whereby this reflector is made. I first take a suitable block of metal shown by the dotted outline 40 in Fig. 4 and on the one side I turn a cylindrical boss 41 while the opposite portion of the block is formed by a surface of revolution of the portion Z of the curve already described, the axis 20—20 being coaxial with the boss 41 and with the axis of revolution. This produces a mushroom-shaped metal block which is now shifted bodily laterally to a new axis of revolution 42—42 parallel to but spaced from the axis 20—20 and the block is again machined to conform to the surface of revolution of the same curve about the axis 42 with a radius equal to slightly less than the sum of the displacement 42 plus the previous radius. While in this position I cut into the block at one side throughout the arc indicated approximately at 43—43 in Fig. 6, thereby slightly flattening the block on one side and taking off a comparatively thin layer indicated at the bottom of Figs. 5 and 6. This accomplished I shift the block still further in the same direction and again turn it about the axis 45, parallel to the first axis but displaced yet further in the same direction, and cause the same to conform throughout a yet narrower area to the surface of revolution of the same curve about a radius similarly increased. In this way I remove a yet narrower region represented by the arc 46—46 in Fig. 8. A still greater number of settings can be made if desired, but is unnecessary. Indeed I have had excellent results with only a single offset cutting.

I now offset the block in the opposite direction to an axis 48—48 and machine it to conform to the surface of revolution of the curve Y about this new axis, the radius of rotation being increased by the distance between 20 and 48. If this displacement is properly chosen, the block will be surfaced over only a part of its circumference, the bottom portion of the block swinging inside this new surface of revolution. In the embodiment here illustrated the curve Y is much smaller than the curve Z owing to the comparatively great vertical displacement of the points S, S′, and for this reason the cut extends more than a half circumference, from 49—49. In actual practice with the measurements here indicated the cut will not extend over even a semi-circumference. Either condition is equally satisfactory since the side wings hereafter described will fill the gap if such exists. Thereupon the block is again shifted to an axis 50 yet further displaced and is again machined to the same surface of revolution about a similarly increased radius, only a comparatively narrow strip being cut along the extreme top of the punch as indicated by the arc 51—51 in Fig. 12.

The block is now shifted to a new and very eccentric axis 52, located somewhat below the axis 20 and very materially to one side, and a side wing turned throughout the arc 53—53 extending from the largest portion of the die to a point substantially opposite the parameter. This wing will appear slightly flattened and somewhat wedge-shaped as indicated at X in Fig. 13; after which the block is again shifted to the axis 54 symmetrically located as regards the axis 52 and corresponding to the arc 55—55.

All these various sections, if the work has been carefully done as herein directed, will merge together with very little unevenness. It will be necessary to smooth down the meeting edges with a fine file but the only care necessary in this regard is not to dress the same too much, merely to remove roughness and produce a smooth blending. The block is now mounted in a base plate 56 shown in Fig. 13 having a shank 57 adapted to fit the socket of the punch press plunger, the face and back of this base plate being inclined the amount by which the axis of the lamp is to diverge from horizontal. The punch is removably secured to this plate so as to permit redressing in case of need.

Owing to this inclination the punch will strike the die at a slightly dfferent angle from that originally exhibited namely along the line 60—60. This die, therefore, consists merely of a steel ring 61 having its inner face 62 shaped to conform to the section of the punch along this line. Common boiler plate is amply sufficient for this ring. The absence of any re-entrant angles or depressions in the surface of the punch dispenses with the need for a receiving member which shall conform closely therewith, in other words a bottoming die. The reflector produced by this tool is illustrated in Figs. 14 and 15, and is made by a single stroke of the tool, the edges of the plate being meanwhile gripped against the ring 61 in the manner well known to all those skilled in the art of metal drawing. A portion of this metal is left as at 65 to form a stiffening rim or flange whose exterior is trimmed to circular shape, while the heel of the reflector is provided with an aperture W for the reception of the lamp socket, the same being located sufficiently above the axis 20—20 to bring the light source the desired distance therefrom.

It will be understood that I do not limit myself to any one relation of distances or ratio between the upper and lower curves or displacement of the foci of said curves or in anywise except as herein claimed. Indeed it will be noted that if these directions be accurately followed the axis 1—1 and 20—20 will overlap each other by a short distance. This is no practical detriment but can be avoided by producing the original blank about an axis located somewhere between the lines 20—20 and 42—42 in Fig. 2. The effect of this is to cause the line 20—20 to describe a cylinder of revolution whose diameter is equal to the sum of the cuts which are to be taken off the top and bottom of the blank. If this be done at the start, then the final punch will exhibit the exit section shown in Fig. 3; if it be not done the device will be narrowed by this amount, although if properly designed the light will still be acceptable. This is only a working allowance such as any carpenter must provide every time he saws a board, but my invention is not restricted to such niceties although the accuracy of the result is improved thereby. Also I have described a device made by swinging the blank about numerous axes 20, 42, 45, 48, 50, 52, 54, all of which are parallel to each other which is extremely convenient in practice since it permits the tool to be made on a common lathe merely by shifting the block about on the face plate, but I do not limit myself to this parallel arrangement. Also I do not limit myself to the use of all the curves and settings shown, as in some instances it may be feasible to dispense with the side wings or other elements; and conversely I may use additional curves and additional settings.

Having thus described my invention what I claim is:

1. A one-piece metal punch for reflectors having its surface convex at all points and having its different regions defined by surfaces of revolution about a plurality of different longitudinal axes.

2. A one-piece metal punch for reflectors having its surface convex at all points and having its different regions defined by surfaces of revolution about a plurality of longitudinal axes, all of which are located in a single plane.

3. A one-piece metal punch for reflectors opposed regions of which are defined by surfaces of revolution about different longitudinal axes of curves which are parabolic as regards a focal point displaced from all such axes.

4. A one-piece metal punch for reflectors, having the portions upon opposite sides of its principal axis defined by surfaces of revolution of dissimilar curves about eccentric axes.

5. A metal punch for reflectors having a portion corresponding to a surface defined by the rotation of a segment of a parabola about an axis inclined to the parabolic axis.

6. A metal punch for reflectors having a portion defined as the surface of revolution of a segment of a parabola about an axis which is oblique to the parabolic axis and displaced from the focal point.

7. A bilaterally symmetrical one-piece metal punch for reflectors whose upper and lower regions are defined by the revolution about different longitudinal axes of a portion of a cubic curve, said axes of revolution being located in the same longitudinal plane.

8. A bilaterally symmetrical metal punch for reflectors having its cross section defined by a pair of opposed semiovals of unequal curvature, the ends of said semiovals being joined by arcs whose centers lie at the same side of the longitudinal axis of the oval and upon opposite sides of the transverse axis.

9. A bilaterally symmetrical metal punch for reflectors whose lateral regions are defined by surfaces of revolution about a pair of spaced axes and whose intermediate regions are defined by surfaces of revolution about a plurality of parallel axes all of which are contained in a plane perpendicular to the plane which contains the first two axes.

10. A bilaterally symmetrical one-piece metal punch for reflectors having opposed portions defined by surfaces of revolution about a plurality of parallel longitudinal axes all of which are contained in a single plane and having its lateral portions connected by surfaces of revolution about axes displaced upon opposite sides of such plane.

11. A one-piece metal punch for automobile headlight reflectors having external portions defined by surfaces of revolution about axes which are oblique to the axis of the punch.

12. A one-piece metal punch for automobile reflectors, the punch axis oblique to the axis of the curve which defines the reflector surface.

In testimony whereof, I hereunto affix my signature.

WILLIAM H. WOOD.